United States Patent [19]

Fukuda et al.

[11] 4,386,176

[45] May 31, 1983

[54] THERMOPLASTIC RESIN COMPOSITION HAVING HIGH HEAT RESISTANCE

[75] Inventors: Kunio Fukuda, Chigasaki; Hideo Kasahara, Yokohama, both of Japan

[73] Assignee: Asahi-Dow Limited, Tokyo, Japan

[21] Appl. No.: 281,126

[22] Filed: Jul. 7, 1981

[30] Foreign Application Priority Data

Jul. 17, 1980 [JP] Japan .................................. 55-96826

[51] Int. Cl.$^3$ ...................... C08L 61/04; C08L 53/02; C08L 71/04
[52] U.S. Cl. ........................................ 525/68; 525/92; 525/132; 525/905
[58] Field of Search .................... 525/68, 92, 132, 905

[56] References Cited

U.S. PATENT DOCUMENTS

| | | | |
|---|---|---|---|
| 3,652,710 | 3/1972 | Holub et al. | 525/132 |
| 3,753,946 | 8/1973 | Holub et al. | 525/132 |
| 4,113,797 | 9/1978 | Lee | 260/876 B |
| 4,147,739 | 4/1979 | Lee | 260/876 R |
| 4,278,775 | 7/1981 | Fava | 525/132 |
| 4,284,735 | 8/1981 | Fava | 525/93 |

*Primary Examiner*—Paul Lieberman
*Assistant Examiner*—Robert E. L. Sellers
*Attorney, Agent, or Firm*—Armstrong, Nikaido, Marmelstein & Kubovcik

[57] ABSTRACT

A thermoplastic resin composition which has high heat resistance, high impact resistance and high molding processability and comprises 5–95% by wt. of a copolymer of a vinyl aromatic compound and an imide compound of an $\alpha,\beta$-unsaturated dicarboxylic acid and 5–95% by wt. of a polyphenylene ether resin together with or without up to 90% by wt. of an impact resistance reinforcing agent.

10 Claims, No Drawings

THERMOPLASTIC RESIN COMPOSITION HAVING HIGH HEAT RESISTANCE

The present invention relates to a thermoplastic resin composition for molding having high heat resistance, high impact resistance and high molding processability. More particularly, it relates to a composition comprising a copolymer of a vinyl aromatic compound and an imide compound of an $\alpha,\beta$-unsaturated dicarboxylic acid and a polyphenylene ether resin, with or without an impact resistance reinforcing agent.

A polyphenylene ether resin is attractive as a resin suitable to wide scope of application since it is excellent in mechanical properties, electric characteristics, heat resistance and, in addition, dimensional stability. However, low molding processability and low impact resistance are its largest defects. As methods to cover up these defects, it has been proposed to blend polystyrene or rubber-reinforced styrene with the polyphenylene ether resin in U.S. Pat. Nos. 3,383,435 and 4,128,602.

Polystyrene has so high compatibility with a polyphenylene ether resin that resin compositions made from the blended material thereof have outstanding physical properties, resulting in much production in industries. On the contrary, styrene copolymers such as styrene-acrylonitrile copolymer and styrene-acrylonitrile-butadiene copolymer have insufficient compatibility with the polyphenylene ether resin, so that resin compositions made from the blended material thereof have large defects such as poor impact resistance and layer peeling off in a shaped article made therefrom, resulting in no resin composition for practical uses. Thus, it is well known that polystyrene and styrene copolymer are much different in compatibility with the polyphenylene ether resin.

U.S. Pat. No. 4,131,598 discloses that a resin composition consisting of a polyphenylene ether resin and a copolymer of a vinyl aromatic compound and an $\alpha,\beta$-unsaturated cyclic anhydride has a heat distortion temperature higher than that of a resin composition consisting of polystyrene and a polyphenylene ether resin. However, a resin composition consisting of a copolymer of a vinyl aromatic compound and an $\alpha,\beta$-unsaturated cyclic anhydride and a polyphenylene ether resin is inferior to a resin compound consisting of polystyrene and a polyphenylene ether resin in molding processability, impact resistance and appearance of molded products and, in addition, it has defects such as lower heat stability and no capability to endure molding at high temperatures.

The present inventors have succeeded in providing materials for molding having not only high molding processability, high impact resistance, nice appearance of molded products and heat distortion temperature but also capability to endure molding at high temperatures, by finding the fact that a copolymer of a vinyl aromatic compound and an imide compound of an $\alpha,\beta$-unsaturated dicarboxylic acid has a very high compatibility with a polyphenylene ether resin.

According to the present invention, a resin composition is provided, which comprises a copolymer of a vinyl aromatic compound and an imide compound of an $\alpha,\beta$-unsaturated dicarboxylic acid and a polyphenylene ether resin, together with or without an impact resistance reinforcing agent. The resin composition of the present invention has much higher heat distortion temperature and higher impact resistance compared with a resin composition consisting of polystyrene and a polyphenylene ether resin.

Also the resin composition of the present invention is much superior to the composition consisting of a copolymer of vinyl aromatic compound and an $\alpha,\beta$-unsaturated cyclic anhydride and a polyphenylene ether resin disclosed in U.S. Pat. No. 4,131,598 in impact resistance, gloss of the molded product and molding processability. Furthermore, the present resin composition is a material for molding which can endure molding at high temperatures and has high heat stability. The difference between the compatibility of a polyphenylene ether resin with a copolymer of a vinyl aromatic compound and an $\alpha,\beta$-unsaturated cyclic anhydride and that of a polyphenylene ether resin with a copolymer of a vinyl aromatic compound and an imide compound of an $\alpha,\beta$-unsaturated dicarboxylic acid can be detected in a viscoelastic measurement. The compatibility of the resin composition of the present invention is, as mentioned above, much superior and it is considered that this difference in compatibility reveals in physical properties of resins.

Copolymers of a vinyl aromatic compound and an imide compound of an $\alpha,\beta$-unsaturated dicarboxylic acid used in the present invention include a non-rubber reinforced copolymer and an impact resistant rubber reinforced copolymer. In general, the copolymer used in the present invention can be prepared according to the conventional technology such as bulk polymerization, solution polymerization or emulsion polymerization based upon radical polymerization disclosed in, for example, German Patent No. 2,644,492. Also as mentioned in U.S. Pat. No. 3,998,907, German Pat. No. 2,343,408 and others, the copolymer of the present invention can be obtained by the treatment of a copolymer of a vinyl aromatic compound and an $\alpha,\beta$-unsaturated cyclic anhydride with a nitrogen-containing compound.

Vinyl aromatic compound which can form the copolymer of the present invention has the formula:

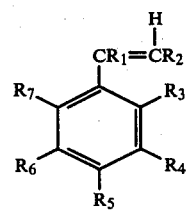

wherein $R_1$ and $R_2$ each is independently selected from the group consisting of lower alkyl or alkenyl groups having 1 to 6 carbon atoms and hydrogen; and $R_3$, $R_4$, $R_5$, $R_6$ and $R_7$ each is independently selected from the group consisting of hydrogen, lower alkyl or alkenyl groups having 1 to 6 carbon atoms, bromine and chlorine. Examples are styrene, o-methylstyrene, p-methylstyrene, dimethylstyrene, m-ethylstyrene, chlorostyrene, isopropylstyrene, tert-butylstyrene, $\alpha$-methylstyrene, ethylvinyltoluene and the like and mixtures thereof.

Imide compounds of $\alpha,\beta$-unsaturated dicarboxylic acid which can form the copolymer used in the present invention are represented by the following general formula:

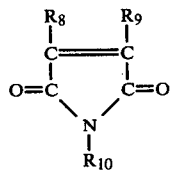

wherein $R_8$, $R_9$ or $R_{10}$ represents hydrogen, alkyl group, alkenyl group, cycloalkyl group, phenyl group, phenylene group or alkylene group, respectively. As examples of them, there can be illustrated maleimide, N-methylmaleimide, N-butylmaleimide, N-cyclohexylmaleinimide, N-phenylmaleinimide, N-(p-methylphenyl)maleimide, N-(3,5-dimethylphenyl)maleimide, N-(p-methoxyphenyl)-maleimide, N-benzylmaleinimide, N-(1-naphthyl)-maleimide and the like.

A rubber reinforced copolymer which can be used in the present invention can be obtained by polymerizing a monomer in the presence of a rubber-like polymer such as polybutadiene rubber, styrene-butadiene rubber, polybutene rubber, hydrogenated styrene-butadiene rubber, acrylonitrile rubber, ethylene-propylene rubber, polyacrylate rubber, polyisoprene rubber or natural rubber.

It is desirable that the copolymer used in the present invention has a composition of 2–40 weight parts of the imide compound of an $\alpha,\beta$-dicarboxylic acid, 98–60 weight parts of the vinyl aromatic compound and 0–50 weight parts of the rubber; however, co-monomer which can copolymerize with the vinyl aromatic compound, for example, methyl acrylate, butyl acrylate, acrylonitrile, etc. can be introduced to said copolymer as far as the monomer does not lower the compatibility of the copolymer with a polyphenylene ether resin, as mentioned above.

Though there are many copolymers which can be used for the present invention, copolymers of the vinyl aromatic compound and maleimide having a phenyl group or a nuclear-substituted phenyl group at N-position, for example, styrene/N-phenylmaleimide copolymer, styrene/N-(p-methylphenyl)maleimide and rubber-reinforced polymers thereof, are particularly preferred from the viewpoint of impact resistance, molding processability, appearance of molded products and the like.

Polyphenylene ether resins used in the present invention are polymers and copolymers represented by the following general formula:

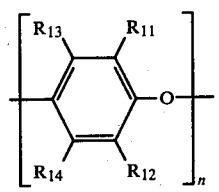

wherein $R_{11}$, $R_{12}$, $R_{13}$ or $R_{14}$ represents the residual group such as the same or different alkyl group, aryl group, halogen or hydrogen and n represents polymerization degree. As concrete examples of them, there can be illustrated poly(2,6-dimethylphenylene-1,4-ether), poly(2,6-diethylphenylene-1,4-ether), poly(2,6-dichlorophenylene-1,4-ether), poly(2,6-dibromophenylene-1,4-ether), poly(2-methyl-6-ethylphenylene-1,4-ether), poly(2-chloro-6-methylphenylene-1,4-ether), poly(2-methyl-6-isopropylphenylene-1,4-ether), poly(2,6-di-n-propylphenylene-1,4-ether), poly(2-bromo-6-methylphenylene-1,4-ether), poly(2-chloro-6-bromophenylene-1,4-ether), poly(2-chloro-6-ethylphenylene-1,4-ether), poly(2-methylphenylene-1,4-ether), poly(2-chlorophenylene-1,4-ether), poly(2-phenylphenylene-1,4-ether), poly(2-methyl-6-phenylphenylene-1,4-ether), poly(2-bromo-6-phenylphenylene-1,4-ether), poly(2,4'-methylphenylphenylene-1,4-ether), poly(2,3,6-trimethylphenylene-1,4-ether), poly(2,3-dimethyl-6-ethylphenylene-1,4-ether), copolymers thereof and vinyl aromatic compound-grafted copolymers thereof. The vinyl aromatic compound-grafted polyphenylene ether resin mentioned in the present invention is a copolymer obtained by graft-copolymerization of styrene, $\alpha$-methylstyrene, methylstyrene, dimethylstyrene, vinyltoluene, tert-butylstyrene, chlorostyrene or the like to said polyphenylene ether resin.

Any impact resistance reinforcing agent can be used in the present invention, as long as it can be further added to said copolymer of a vinyl aromatic compound and an imide compound of an $\alpha,\beta$-unsaturated dicarboxylic acid and the polyphenylene ether resin to improve the impact resistance; however, a graftcopolymer obtained by graft-copolymerization of a monomer which contains the vinyl aromatic compound as the main component to the rubber-like polymer and various thermoplastic elastomers are preferable.

The graftcopolymer mentioned in the present invention which is obtained by graft-copolymerization of the monomer which contains the vinyl aromatic compound as the main component to the rubber-like polymer means a polymer obtained by emulsion graft-copolymerization of the monomer which contains the vinyl aromatic compound as the main component to the rubber-like polymer in a latex-like state, a polymer obtained by such means as bulk polymerization, solution polymerization or suspension polymerization of a solution obtained by dissolving the rubber-like polymer in a solvent whose main component is the vinyl aromatic compound and the like. As the rubber-like polymer used herein, there can be illustrated polybutadiene, styrene-butadiene copolymer, acrylonitrile-butadiene copolymer, ethylene-propylene copolymer, polyacrylates, polyisoprene or the like. As the vinyl aromatic compound, there can be illustrated styrene, o-methylstyrene, p-methylstyrene, dimethylstyrene, isopropylstyrene, tert-butylstyrene, $\alpha$-methylstyrene, ethylvinyltoluene or the like. As co-monomer used together with the vinyl aromatic compound, there is an acrylate, a methacrylate, acrylonitrile, methacrylonitrile, methacrylic acid, acrylic acid or the like. Such the co-monomer should be used in a range wherein it does not lower the compatibility thereof with the polyphenylene ether resin.

Though a high-impact polystyrene usually sold at a market can be used for the impact resistance reinforcing agent, a preferable graftcopolymer is one having a high content of rubber-like polymer, preferably not lower than 12 weight percent of rubber-like polymer in the graftcopolymer, most preferably 30–70 weight percent. Particle size of dispersed rubber in the graftcopolymer may range widely from small one obtained by emulsion polymerization to large one obtained by bulk polymerization, solution polymerization or suspension polymerization.

The thermoplastic elastomer referred to above means styrene-butadiene block-copolymer, hydrogenated styrene-butadiene copolymer, ethylene-propylene elastomer, styrene-grafted ethylene-propylene elastomer, polyester elastomer or the like. As the styrene-butadiene block-copolymer, any of AB-type, ABA-type, ABA-taper type and radial teleblock type ones may be used.

The graftcopolymer and the elastomer can be used individually or in combination as an impact resistance reinforcing agent.

The polyphenylene ether resin, the copolymer of vinyl aromatic compound and imide compound of $\alpha,\beta$-unsaturated dicarboxylic acid and the graftcopolymer obtained by graft-copolymerization of vinyl aromatic compound to rubber-like polymer or the thermoplastic elastomer can be blended in an arbitrary ratio; however, from the viewpoint of balance of mechanical properties, thermal properties and the like, it is preferable that 5-95 wt.% of the polyphenylene ether resin, 5-95 wt.% of the copolymer of vinyl aromatic compound and imide compound of $\alpha,\beta$-unsaturated dicarboxylic acid and 0-90 wt.% of the impact resistant reinforcing agent are contained in a resin composition. Furthermore, it is most preferable that 20-70 wt.% of the polyphenylene ether resin, 10-80 wt.% of the copolymer of vinyl aromatic compound and imide compound of $\alpha,\beta$-unsaturated dicarboxylic acid and 0-60 wt.% of the impact resistance reinforcing agent are contained in a resin composition. Furthermore, the total amount of rubber-like polymers contained in the rubber-reinforced copolymer of vinyl aromatic compound and imide compound of $\alpha,\beta$-unsaturated dicarboxylic acid, the graftcopolymer and the thermoplastic elastomer is most preferably 0-30 wt.% in the resin composition of the present invention. When the content of the rubber-like polymer is too high, there are caused undesirable results such as decreases in heat resistance and in rigidity of the resin composition.

A satisfactory material for molding which is well-balanced in heat resistance and molding processability, has high heat stability and can sufficiently endure molding at high temperatures can be obtained from blending the copolymer of vinyl aromatic compound and imide compound of $\alpha,\beta$-unsaturated dicarboxylic acid with the polyphenylene ether resin. Furthermore, an additional combination of the impact resistance reinforcing agent to the above blend can facilitate an improvement in well-balancing among impact resistance-heat resistance-molding processability, without any degrading high heat stability and molding performance above. The combination of only the copolymer of vinyl aromatic compound and imide compound of $\alpha,\beta$-unsaturated dicarboxylic acid and the impact resistance reinforcing agent used in the the present invention does not bring about sufficiently high impact resistance and high heat distortion temperature. The combination of only the polyphenylene ether resin and the impact resistance reinforcing agent used in the present invention does not bring about satisfactory molding processability, either. On the other hand, the present combination of the three components mentioned above in a range described in the present invention can reveal a synergetic effect to produce a material which is well-balanced in impact resistance, heat resistance and molding processability.

The present invention is never limited by the process to obtain the blended resin composition. One of the processes is that the raw materials are molten and kneaded with an extruder, a roll mixer, a Bunbury's mixer, a kneader mixer or the like. Another process is that the vinyl aromatic compound monomer is polymerized in the presence of the polyphenylene ether resin.

It is possible to make the resin composition contain a reinforcing filler. As the reinforcing filler, there can be used glass fiber, carbon fiber, asbestos, wallastonite, calcium carbonate, talc, mica, zinc oxide, titanium oxide, potassium titanate and the like. It is preferable to use the filler in a range of 1-50 wt.% of the total composition.

The resin composition of the present invention may further include a flame retarder and a plasticizer. Flame retarders and plasticizers conventionally used such as phosphorous compounds, for example, triphenylphosphate, and halogen-containing compounds, for example, decarbromodiphenyl oxide, can be used.

Also the present composition may further contain other additives such as colorants and stabilizers therein. Other polymers such as polyethylene and polypropylene may be blended in the resin composition as far as they do not lower the characteristics such as mechanical properties. The preferable amount of these resins to be added is not more than 20 wt.%.

The present invention will be explained in detail hereinbelow with examples; however, the present invention is never limited thereby. The part means weight part.

EXAMPLES 1-2

A styrene-N-phenylmaleimide copolymer (having an N-phenylmaleimide content of 10 wt.%) and poly(2,6-dimethylphenylene-1,4-ether) having $\eta sp/c=0.65$ were blended in a ratio shown in Table 1 and the mixture was molten and extruded with a twin-screw extruder to obtain a resin composition in pellet state. Test pieces were injection-molded from the resin composition thus obtained and tensile strength, elongation, Izod impact strength and heat distortion temperature were measured in accordance with the method described in JIS K6871. The results are shown in Table 1.

The heat stability of the resin composition was evaluated from the surface blisters produced on the molded product and decrease of physical properties when the injection molding of the resin composition was conducted at 280°-300° C.

References 1, 2 and 3

Tests were conducted in accordance with the same procedure as that in Example 1, using 65 parts of DYLARK ®332 (styrene-maleic anhydride copolymer, produced by ARCO POLYMER CO.) and 35 parts of poly(2,6-dimethylphenylene-1,4-ether). The results are also shown in Table 1. When only poly(2,6-dimethylphenylene-1,4-ether) was used, the product had very low molding processability resulting in difficulty to obtain a satisfactory molded piece even at a temperature higher than 300° C. Also, properties of the styrene-N-phenylmaleimide copolymer are shown in Table 1 (Reference 3).

EXAMPLE 3

Tests were conducted in accordance with the same procedure as that in Example 1 except that a styrene-N-phenylmaleimide compolymer having an N-phenylmaleimide content of 18 wt.% was used in place of the styrene-N-phenylmaleimide copolymer. Results are also shown in Table 1.

EXAMPLE 4

Sixty parts of a rubber-reinforced styrene-N-phenylmaleimide (having an N-phenylmaleimide content of 18 wt.% and a styrene-butadiene copolymer rubber content of 9 wt.%) and 40 parts of poly(2,6-dimethylphenylene-1,4-ether) were molten and extruded with a twin-screw extruder to obtain a resin composition in pellet state. Physical properties such as melt-flow index, gloss value of the molded product and others were measured and the results are shown in Table 2. The gloss value of the molded product was shown by reflectivity of light.

EXAMPLE 5

Fifty parts of rubber-reinforced styrene-N-phenylmaleimide copolymer (having an N-phenylmaleimide content of 18 wt.% and a styrene-butadiene copolymer rubber content of 9 wt.%) and 50 parts of styrene-grafted-poly-(2,6-dimethylphenylene-1,4-ether) obtained by mixing 50 parts of poly(2,6-dimethylphenylene-1,4-ether), 10 parts of styrene and 0.6 part of di-tert-butyl peroxide in a Henschel mixer and then graft-copolymerizing the mixture at 280° C. in molten and kneaded state with a twin-screw extruder, were mixed and molten with a twin-screw extruder to obtain a resin composition in pellet state. Physical properties such as melt-flow index, gloss value of the molded product and others were measured. The results are shown in Table 2.

EXAMPLE 6

Forty six parts of a styrene-N-phenylmaleimide copolymer (having an N-phenylmaleimide content of 18 wt.%) 45 parts of poly(2,6-dimethylphenylene-1,4-ether) having a $\eta sp=0.65$ and 9 parts of a graft-copolymer obtained by emulsion graft-copolymerization of 40 parts of styrene in the presence of 60 parts of polybutadiene latex were molten and mixed with a twin-screw extruder to obtain a resin composition in pellet state. Physical properties such as melt-flow index, gloss value of the molded product and others were measured and the results are shown in Table 2.

EXAMPLE 7

After adding 5.0 parts of triphenylphosphate to 100 parts of the materials in Example 6, the mixture was molten and mixed with a twin-screw extruder to obtain a resin composition in pellet state. Similar tests to those in Example 6 were conducted and the results are shown in Table 2.

EXAMPLE 8

Example 6 was repeated except that a graft-copolymer obtained by emulsion graft-copolymerization of 35 parts of styrene and 5 parts of methyl methacrylate in the presence of 60 parts of polybutadiene latex was used instead of the emulsion graftcopolymer. The results are shown in Table 2.

EXAMPLES 9-13

Example 6 was repeated each using a styrene-N-phenylmaleimide copolymer (having an N-phenylmaleimide content of 18 wt.%) and a styrene-grafted-poly(2,6-dimethylphenylene-1,4-ether) used in Example 5 and, as an impact resistance reinforcing agent, an emulsion graftcopolymer used in Example 6, STYRON ®XH 602 (high impact polystyrene, produced by Asahi-Dow Limited), KRATON G 1650 (hydrogenated styrene-butadiene block-copolymer, produced by Shell Chemical Co.) or TUFPRENE ® (styrene-butadiene block-copolymer, produced by Asahi Kasei Kogyo Kabushiki Kaisha), respectively and mixing them in a ratio shown in Table 3. The results are shown in Table 3.

References 4 and 5

Example 6 was repeated each except that DYLARK ®332 (styrene-maleic anhydride copolymer, produced by ARCO POLYMER CO.) [Reference 4] and STYRON ®685 (polystyrene, produced by Asahi-Dow Limited) [Reference 5] were used, respectively, instead of the styrene-N-phenylmaleimide. The results are shown in Table 2. The composition of Reference 5 has good mechanical properties and heat stability. The composition has been commercialized. However, the composition has lower heat distortion temperature than that of Example 6. When styrene-maleic anhydride copolymer was used, a molded piece by injection molding showed surface blisters (bad heat stability) and had no satisfactory Izod impact strength.

Reference 6

Example 8 was repeated except that TYRIL ®783 (styrene-acrylonitrile copolymer, produced by Asahi-Dow Limited) was used instead of the styrene-N-phenylmaleimide copolymer. The results are shown in Table 2. A molded piece prepared by injection molding from the resin composition obtained herein showed a phenomenon of layer peeling off. Also high Izod impact strength was not obtained therefrom.

Reference 7

Tests were conducted in accordance with Example 6 using a blend of 91 parts of poly(2,6-dimethylphenylene-1,4-ether) of said example and 9 parts of emulsion graft copolymer of said example, without styrene-N-phenylmaleimide. The molding processability of the resin composition obtained was very poor and it was difficult to obtain a satisfactory molded piece even at a temperature higher than 300° C.

Testing method JIS K6871 of Examples 1-2 is applied to all of the other examples and references.

TABLE 1

| Combination recipe and physical properties of resin compositions | | | | | | |
|---|---|---|---|---|---|---|
| | Example 1 | Example 2 | Example 3 | Reference 1 | Reference 2 | Reference 3 |
| Combination recipe | | | | | | |
| Poly(2,6-dimethyl-phenylene-1,4-ether) | 35 | 50 | 35 | 35 | 100 | — |
| Styrene-N—phenyl-maleinimide copolymer (having N—phenyl-maleinimide content of 10%) | 65 | 50 | — | — | — | 100 |

TABLE 1-continued

Combination recipe and physical properties of resin compositions

| | Example 1 | Example 2 | Example 3 | Reference 1 | Reference 2 | Reference 3 |
|---|---|---|---|---|---|---|
| Styrene-N—phenyl-maleimide copolymer (having N—phenyl-maleinimide content of 18%) | — | — | 65 | — | — | — |
| DYLARK 332 (styrene-maleic anhydride copolymer) | — | — | — | 65 | — | — |
| Physical properties | | | | | | |
| Heat distorton temperature (°C.) | 122 | 128 | 125 | 120 | difficult | 99 |
| Tensile strength (kg/cm$^2$) | 630 | 650 | 630 | 620 | to be | 480 |
| Elongation (%) | 5 | 7 | 6 | 2 | molded | 2 |
| Izod impact strength (kg · cm/cm) | 1.3 | 2.0 | 1.5 | 1.0 | | 0.8 |
| Heat stability | No surface blisters (good heat stability) | No surface blisters (good heat stability) | No surface blisters (good heat stability) | Surface blisters (bad heat stability) | — | |

TABLE 2

Physical properties of resin compositions

| | Example 4 | Example 5 | Example 6 | Example 7 | Example 8 | Reference 4 | Reference 5 | Reference 6 |
|---|---|---|---|---|---|---|---|---|
| Physical properties | | | | | | | | |
| Heat distortion temperature (°C.) | 130 | 128 | 136 | 122 | 135 | 125 | 122 | 122 |
| Tensile strength (Kg/cm$^2$) | 600 | 590 | 660 | 600 | 650 | 600 | 620 | 580 |
| Elongation (%) | 45 | 40 | 28 | 32 | 25 | 3 | 30 | 2 |
| Izod impact strength (Kg · cm/cm) | 18 | 17 | 15 | 16 | 12 | 5 | 13 | 3 |
| Melt-flow index* (g/10 min.) | 6 | 12 | 7 | 22 | 5 | 3 | 9 | 5 |
| Heat stability | No surface blisters (good heat stability) | No surface blisters (good heat stability) | No surface blisters (good heat stability) | No surface blisters (good heat stability) | No surface blisters (good heat stability) | Surface blisters (bad heat stability) | No surface blisters (good heat stability) | No surface blisters (good heat stability) |
| Peeling | o | o | o | o | o | o | o | x |
| Gloss value (%) | 68 | 65 | 65 | 70 | 70 | 15 | 65 | 20 |

*at 250° C. under a load of 21.6 kg

TABLE 3

Combination recipe and physical properties of resin compositions

| | Example 9 | Example 10 | Example 11 | Example 12 | Example 13 |
|---|---|---|---|---|---|
| Combination recipe | | | | | |
| Styrene-grafted-poly(2,6-dimethylphenylene-1,4-ether) | 50 | 50 | 40 | 40 | 40 |
| Styrene-N—phenylmaleimide copolymer (having N—phenylmaleinimide content of 18%) | 40 | 20 | 30 | 30 | 40 |
| Emulsion graft copolymer | 10 | — | — | — | — |
| STYRON XH 602 | — | 30 | 20 | — | — |
| TUFPRENE | — | — | — | — | 20 |
| KRATON G 1650 | — | — | 10 | 30 | — |
| Physical properties | | | | | |
| Heat distortion temperature (°C.) | 125 | 123 | 119 | 115 | 118 |
| Tensile strength (Kg/cm$^2$) | 600 | 610 | 500 | 420 | 450 |
| Elongation (%) | 30 | 20 | 35 | 45 | 30 |
| Izod impact strength (Kg · cm/cm) | 12 | 8 | 12 | 12 | 9 |

We claim:

1. A thermoplastic resin composition which has high heat resistance and comprises 5–95 wt.% of a copolymer of a vinyl aromatic compound and an imide compound of an $\alpha,\beta$-unsaturated dicarboxylic acid having a phenyl group at N-position or a nuclear-substituted phenyl group at N-position, 5–95 wt.% of a polyphenylene ether resin and 0–90 wt.% of an impact resistance reinforcing agent.

2. The resin composition of claim 1 wherein the copolymer of a vinyl aromatic compound and an imide compound of an $\alpha,\beta$-unsaturated dicarboxylic acid is a compolymer of 2–40 wt.% of the imide compound of $\alpha,\beta$-unsaturated dicarboxylic acid and 60–98 wt.% of the vinyl aromatic compound.

3. The resin composition of claim 1 or 2 wherein the copolymer of a vinyl aromatic compound and an imide compound of an $\alpha,\beta$-unsaturated dicarboxylic acid is a styrene-N-phenylmaleimide copolymer.

4. The resin composition of claim 1 or 2 wherein the copolymer of a vinyl aromatic compound and an imide compound of an $\alpha,\beta$-unsaturated dicarboxylic acid is a rubber-reinforced styrene-N-phenylmaleimide copolymer.

5. The resin composition of claim 1 wherein the polyphenylene ether resin is poly(2,6-dimethylphenylene-1,4-ether).

6. The resin composition of claim 1 wherein the polyphenylene ether resin is a vinyl aromatic compound-grafted-poly(2,6-dimethylphenylene-1,4-ether).

7. The resin composition of claim 1 wherein the impact resistance reinforcing agent is a graftcopolymer obtained by graft-copolymerization of a monomer whose main component is a vinyl aromatic compound to a rubber-like polymer.

8. The resin composition of claim 7 wherein the graft-copolymer contains a rubber-like polymer in an amount exceeding 12 wt.%.

9. The resin composition of claim 1 wherein the impact resistance reinforcing agent is at least one of styrene-butadiene block-copolymer, hydrogenated styrene-butadiene block-copolymer, ethylene-propylene elastomer, styrene-grafted-ethylene-propylene elastomer and polyester elastomer.

10. The resin composition of claim 1 wherein it comprises 10–80 wt.% of the copolymer of a vinyl aromatic compound and an imide compound of an $\alpha,\beta$-unsaturated dicarboxylic acid, 20–70 wt.% of the polyphenylene ether resin and 0–60 wt.% of the impact resistant reinforcing agent.

* * * * *